United States Patent
Melin et al.

(10) Patent No.: US 7,340,025 B2
(45) Date of Patent: Mar. 4, 2008

(54) PLASMA ANTENNA GENERATOR AND METHOD OF USING SAME

(75) Inventors: Roger W. Melin, Arlington, TX (US); Joseph M. Wright, Southlake, TX (US)

(73) Assignee: Lockheed Martin Corporation, Grand Prairie, TX (US)

( * ) Notice: Subject to any disclaimer, the term of this patent is extended or adjusted under 35 U.S.C. 154(b) by 132 days.

(21) Appl. No.: 11/096,953

(22) Filed: Apr. 1, 2005

(65) Prior Publication Data

US 2007/0263759 A1    Nov. 15, 2007

(51) Int. Cl.
*G21B 1/00* (2006.01)
*F42B 1/00* (2006.01)

(52) U.S. Cl. ............ 376/141; 376/144; 376/136; 376/132; 102/306; 102/307; 102/323; 102/331

(58) Field of Classification Search ............ 376/141, 376/144, 136, 132, 121–130; 102/305–306, 102/323, 331, 378, 504, 275.5
See application file for complete search history.

(56) References Cited

U.S. PATENT DOCUMENTS

| | | | |
|---|---|---|---|
| 3,136,251 A | 6/1964 | Witow | |
| 3,598,051 A | 8/1971 | Avery et al. | |
| 4,982,647 A * | 1/1991 | Hertzberg et al. | ........ 89/8 |
| 5,972,506 A | 10/1999 | Leichter et al. | |
| 6,340,956 B1 | 1/2002 | Bowen et al. | |
| 6,843,178 B2 | 1/2005 | Wood et al. | |

* cited by examiner

*Primary Examiner*—Tuyet Vo
(74) *Attorney, Agent, or Firm*—Daren C. Davis; James E. Walton (57) ABSTRACT

A plasma antenna generator includes a ceramic portion including an ionizable material, an explosive charge adapted to project at least part of the ceramic portion upon detonation at a velocity sufficient to ionize the ionizable material, and a detonator coupled with the explosive charge. A plasma antenna generator includes a housing defining a plurality of openings therein and a plurality of shaped charge devices or a plurality of explosively formed projectile devices received in the openings. Each of the devices includes an explosive charge, a detonator coupled with the explosive charge, and a ceramic liner, the ceramic liner comprising an ionizing material. A method includes providing an explosive device and a ceramic portion comprising an ionizable material disposed proximate the explosive device, detonating the explosive device to propel the ceramic portion, and ionizing the ionizable material to form at least one plasma trail.

18 Claims, 6 Drawing Sheets

PLASMA ANTENNA GENERATOR AND METHOD OF USING SAME

BACKGROUND

1. Field of the Invention

This invention relates to a plasma antenna generator and a method of using the plasma antenna generator. In particular, the invention relates to a plasma antenna generator comprising a ceramic material that provides ionizable material for plasma antenna generation.

2. Description of Related Art

Electromagnetic energy can be used in many ways to sense or affect objects from a distance. Radar, for example, is reflected electromagnetic energy used to determine the velocity and location of a targeted object. It is widely used in such applications as aircraft and ship navigation, military reconnaissance, automobile speed checks, and weather observations. Electromagnetic energy may also be used to jam or otherwise interfere with radio frequency transmissions or to affect the radio transmitting equipment itself.

Figure 1:
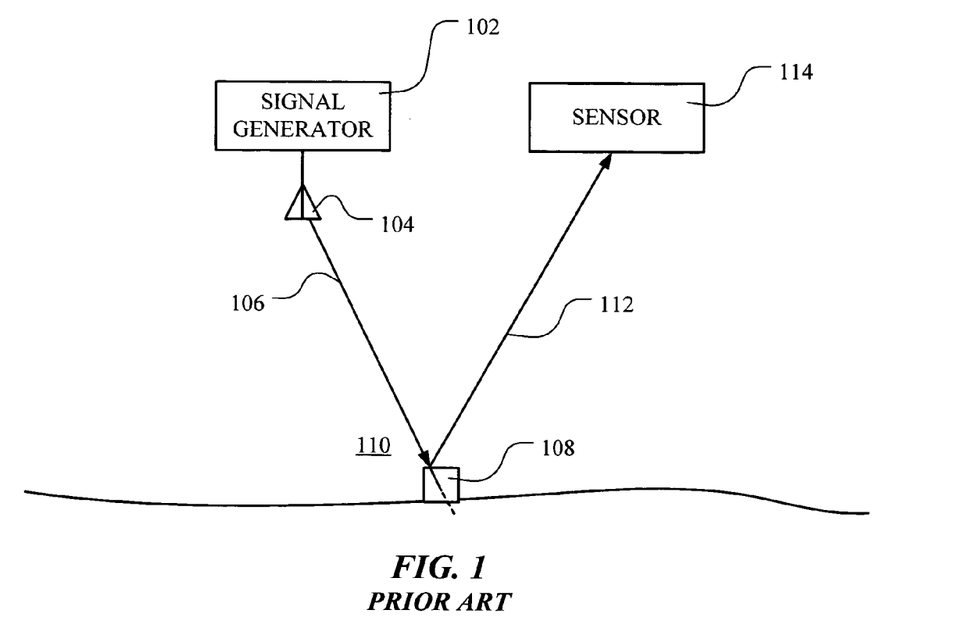
FIG. 1 is a stylized diagram of a conventional sensing system.

In certain situations, it may be desirable to radiate one or more electromagnetic pulses over an area to sense or affect objects within the area. Generally, as illustrated in FIG. 1, a signal generator 102 generates an electromagnetic pulse, which is radiated by an antenna 104 as an electromagnetic wave 106. Upon encountering a boundary, such as a boundary between an object 108 and the air 110, a portion of the energy of the wave 106 is reflected as an electromagnetic wave 112. The reflected wave 112 may then be received by a sensor 114, which analyzes the reflected wave 112 to determine various characteristics of the object 108.

It is often desirable to deploy such antennas, e.g., the antenna 104, during flight. For example, a spacecraft approaching a planetary body may deploy an antenna so that electromagnetic energy may be directed toward the surface of the body. Conventional antennas generally include rigid or semi-rigid members that may be compactly folded for storage and transport and then unfolded when needed. Alternatively, conventional antennas may be wires that are explosively deployed or deployed by parachutes. A substantial amount of time is often required to deploy such antennas, which results in additional planning to determine the appropriate time to begin deployment so that the antenna will be available when needed. Further, circumstances may arise in which the immediate transmission of electromagnetic energy is desirable. If the antenna has not been deployed, there may not be sufficient time to deploy the antenna and transmit the electromagnetic energy in the desired time frame.

It may also be desirable in certain situations to transmit electromagnetic energy having a broad spectrum of frequencies or to transmit low frequency electromagnetic energy. Generally, longer antennas are capable of transmitting electromagnetic energy more efficiently at lower frequencies than shorter antennas. Such longer antennas may typically be capable of transmitting electromagnetic energy having higher frequencies as well. Longer foldable antennas require more storage space, may be more complex, and generally take longer to unfold.

SUMMARY OF THE INVENTION

In one aspect, the present invention provides a plasma antenna generator. The plasma antenna generator includes a ceramic portion including an ionizable material, an explosive charge adapted to project at least part of the ceramic portion upon detonation at a velocity sufficient to ionize the ionizable material, and a detonator coupled with the explosive charge.

In another aspect, the present invention provides a plasma antenna generator. The plasma antenna generator includes a housing defining a plurality of openings therein and a plurality of shaped charge devices or a plurality of explosively formed projectile devices received in the openings. Each of the devices includes an explosive charge, a detonator coupled with the explosive charge, and a ceramic liner, the ceramic liner comprising an ionizing material.

In yet another aspect of the present invention, a method is provided. The method includes providing an explosive device and a ceramic portion comprising an ionizable material disposed proximate the explosive device, detonating the explosive device to propel the ceramic portion, and ionizing the ionizable material to form at least one plasma trail.

Additional objectives, features and advantages will be apparent in the written description which follows.

DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present invention relates to a plasma antenna generator comprising an explosive device that, upon detonation, propels a ceramic portion comprising an ionizable material at a velocity sufficient to ionize the ionizable material. The ceramic portion may comprise a portion of the explosive device or merely be disposed proximate to the explosive device. Further, the ceramic portion may comprise a component having a use other than to provide ionizable material for the plasma antenna generator. For example, the ceramic portion may comprise a component, device, or apparatus that serves another function in a vehicle comprising the plasma antenna generator. Various illustrative embodiments of the present invention are described in greater detail below.

Figure 2A:
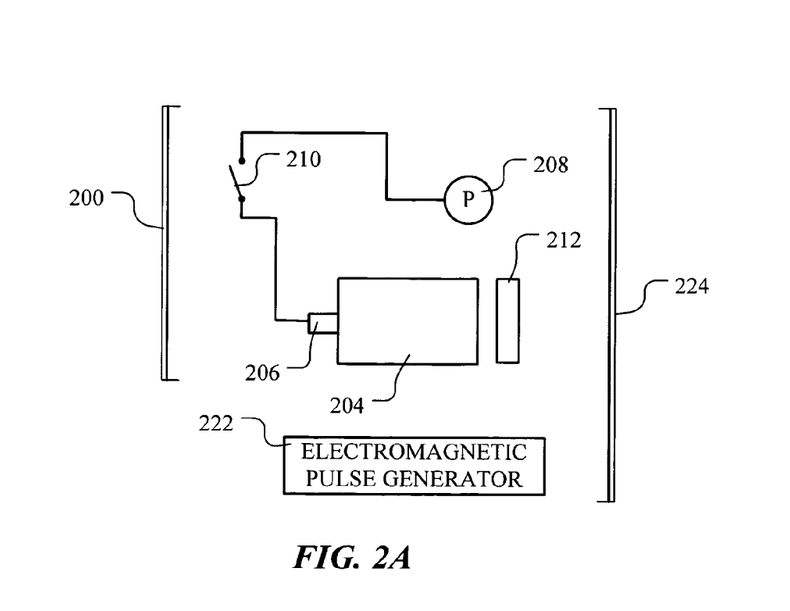
FIG. 2A is a stylized block diagram of a first illustrative embodiment of an electromagnetic pulse transmitting system according to the present invention.
Figure 2B:
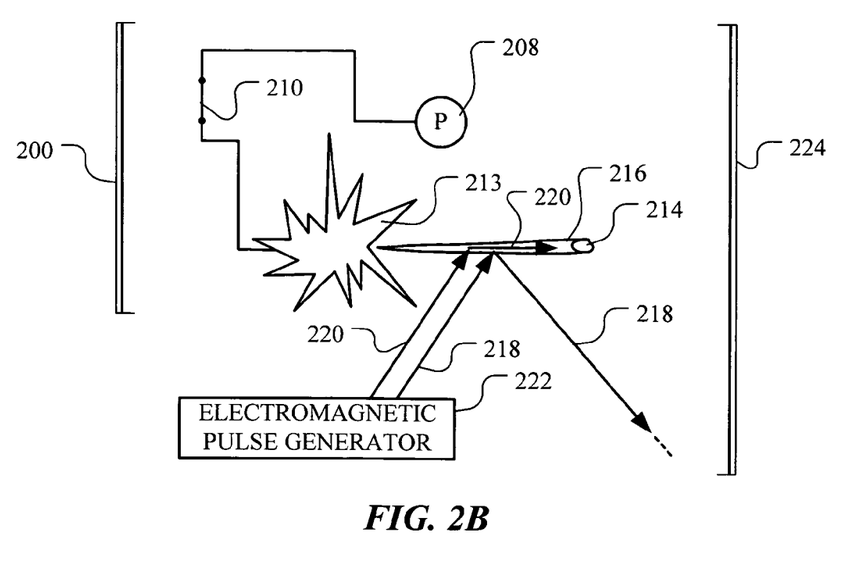
FIG. 2B illustrates the electromagnetic pulse transmitting system of FIG. 2A in operation.

A first illustrative embodiment of a plasma antenna generator 200 according to the present invention is shown in FIGS. 2A and 2B. Referring to FIG. 2A, the plasma antenna generator 200 includes an explosive device 204 and a detonator 206 attached thereto for detonating the explosive device 204. A power source 208 is coupled with the detonator 206 via a switch 210 that, when closed, provides a path for power from the power source 208 to activate the detonator 206 and detonate the explosive device 204. While the switch 210 is illustrated in FIGS. 2A and 2B as a common throw-type switch, the invention is not so limited. The switch 210 may be any switch known to the art that is suitable for switching power from the power source 208 to the detonator 206. In alternative embodiments, for example, the switch 210 may be an electronic switch.

In the illustrated embodiment, the explosive device 204 includes an explosive charge (not shown in FIGS. 2A and 2B), made of HMX (cyclotetramethylenetetranitramine), an HMX blend, RDX (cyclotrimethylenetrinitramine), an RDX blend, LX-14 (an HMX/estane blend), or the like. However, other suitable explosive materials may be employed. The explosive device 204 may itself include a ceramic portion comprising an ionizable material arranged in various configurations or a ceramic portion 212 may be disposed proximate the explosive device 204 (as will be more fully described below).

Upon detonating the explosive device 204, as shown in FIG. 2B and represented by a graphic 213, particles 214 of the ionizable material are propelled by the explosive force through the air. In the illustrated embodiment, the particles 214 are propelled in any chosen, random, or chance direction, and are aerodynamically heated. In alternative embodiments, the particles 214 may be propelled in a directed fashion. Only one of the particles 214 is shown in FIG. 2B for clarity. The particles 214 may be, for example, atoms, molecules, pieces, and/or slugs of the ionizable material.

As the particles 214 are heated by friction with the atmosphere, the ionizable material is ionized, producing plasma trails 216 (only one shown for clarity) of ions and free electrons (not individually shown). The free electrons of the plasma trail 216 act as an antenna that may reflect electromagnetic waves 218 or propagate electromagnetic waves 220. Generally, electromagnetic waves having frequencies below a plasma cut-off frequency of the plasma trail 216 (e.g., the electromagnetic waves 218) are reflected by the plasma trail 216. Electromagnetic waves having frequencies equal to or greater than the plasma cut-off frequency (e.g., the electromagnetic waves 220) generally propagate through the plasma trail 216. The plasma cut-off frequency of the plasma trail 216 is generally proportional to the square root of its electron density. Further, the plasma trails 216 may generally be longer than conventional antennas, thereby allowing electromagnetic waves having lower frequencies (i.e., longer wavelengths) to be reradiated as compared to conventional antennas.

In some embodiments, an electromagnetic pulse generator 222 may be combined with the plasma antenna generator 200 to form an electromagnetic pulse transmitting system 224. In such embodiments, the electromagnetic pulse generator 222 generates a pulse of electromagnetic waves (e.g., the electromagnetic waves 218, 220) that may be reflected from or propagated through the plasma trail 216. Particular embodiments of the electromagnetic pulse generator 222 will be discussed in greater detail below.

Figure 2C:
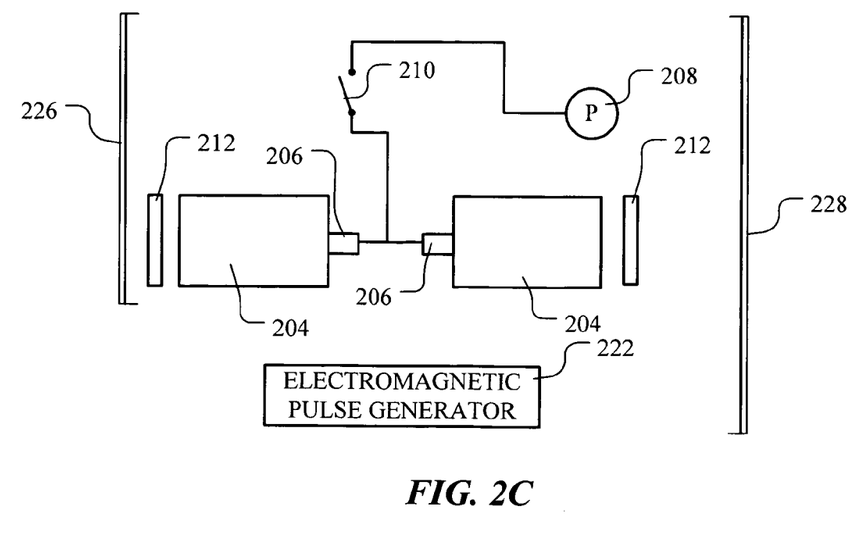
FIG. 2C is a stylized block diagram of a second illustrative embodiment of an electromagnetic pulse transmitting system alternative to that of FIGS. 2A and 2B according to the present invention.
Figure 2D:
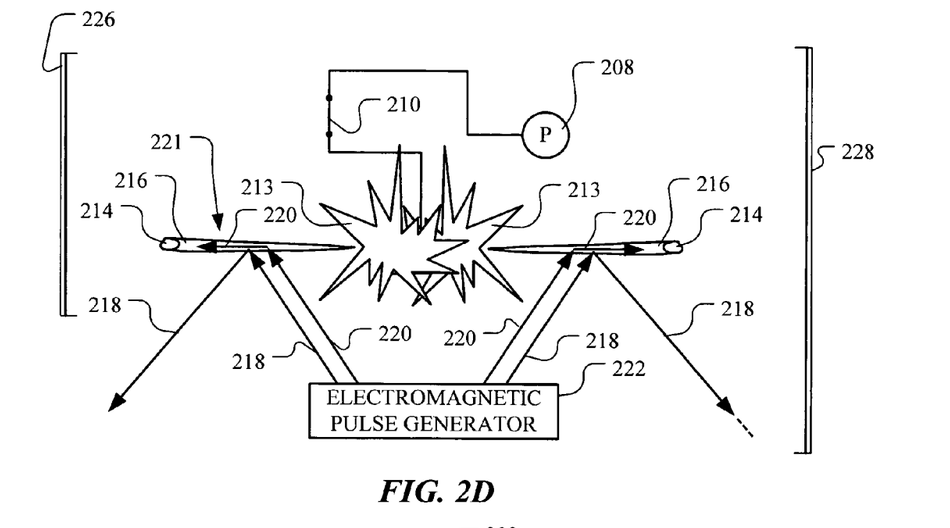
FIG. 2D illustrates the electromagnetic pulse transmitting system of FIG. 2C in operation.

While the plasma antenna generator 200 illustrated in FIGS. 2A and 2B includes only one explosive device 204, the present invention is not so limited and may include any number of explosive devices 204. For example, in a second embodiment, a plasma antenna generator 226, as shown in FIG. 2C, includes two explosive devices 204, either comprising the ceramic portion 212 comprising an ionizable material or disposed proximate the ceramic portion 212 comprising an ionizable material. Upon detonating the explosive devices 204, particles 214 are propelled in different directions, as shown in FIG. 2D. The resulting plasma trails 216 form a dipole-like antenna 221 that reradiates the electromagnetic waves 218 or propagates the electromagnetic waves 220. Any of the explosive devices 204, if more than one is present, may be configured to propel the particles in any chosen, random, or chance direction with respect to any of the other explosive devices 204. As discussed above concerning FIGS. 2A and 2B, the electromagnetic pulse generator 222 may be combined with the plasma antenna generator 226 to form an electromagnetic pulse transmitting system 228.

The ionizable material may comprise any material capable of being ionized as a result of aerodynamic heating induced by being propelled by the explosive charge 204. For example, the ionizable material may comprise an alkali metal, a compound of one or more alkali metals (e.g., alkali salts, alkali carbonates, and the like) or may comprise a constituent of a compound of one or more alkali metals. Further, the ionizable material may comprise a clathrate of an alkali metal, a constituent of the clathrate of the alkali metal, an intercalation compound of an alkali metal, or a constituent of the intercalation compound of the alkali metal. Alkali metals include lithium, sodium, potassium, rubidium, cesium, and francium. In any case, the ionizable material is contained in a ceramic portion and the ceramic portion may be crystalline or amorphous (e.g., glass). For example, soda-lime glasses and borosilicate glasses, as well as $Ca-Al_2O_3-SiO_2$, $Mg-CaO$, $Na-SiO_3-SiO_2$, and $ZnO-SiO_2$ ceramics typically contain up to about 15 percent alkali. Other ceramics, such as potassium niobate, tantalum niobate, and barium titanate contain up to about five percent alkali.

Figures 3A, 3B, 3C:
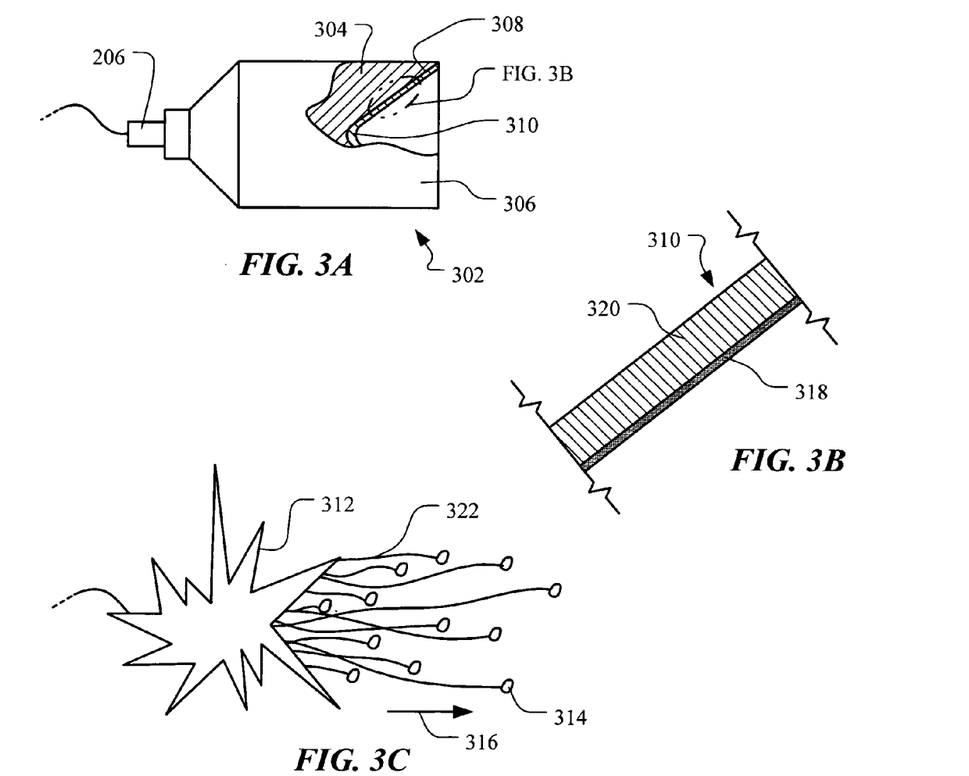
FIG. 3A is a stylized, partially cross-sectioned, side view of a first illustrative embodiment of an explosive device that may be employed in the embodiments of FIGS. 2A-2D.
FIG. 3B is a cross-sectional view of a portion of the liner of FIG. 3A that includes a layer of the ionizable material affixed to the liner thereof.
FIG. 3C is a stylized diagram of the explosive device of FIG. 3A in operation.

As indicated above, the explosive device 204 may take many different forms. FIG. 3A illustrates a first embodiment of the explosive device 204 according to the present invention. In the illustrated embodiment, the explosive device 204 comprises a shaped charge device 302. Conventionally, shaped charge devices employ explosive products to create great pressures that accelerate a metallic liner and form a very high-speed jet. Accordingly, materials chosen for conventional shaped charge liners are capable of forming such a jet. The shaped charge device 302 of the present embodiment, however, uses high-pressure explosive products that are created by detonating the highly explosive material to shatter and expel a ceramic liner, rather than forming a conventional jet. Note that a shaped charge device is not required to practice the present invention.

As shown in FIG. 3A, the shaped charge device 302 of the illustrated embodiment comprises an explosive charge 304 partially encased by a casing 306. The explosive charge 304 may be made of any explosive material capable of accelerating particles of the device 302's liner 310 sufficiently to generate a plasma trail. In various embodiments, the explosive material may comprise an explosive having a high detonation velocity and/or high brisance, e.g., materials containing HMX, an HMX blend, RDX, an RDX blend, LX-14, or the like. Generally, a high detonation velocity explosive is characterized as that having a detonation velocity of at least about 6000 meters per second.

Still referring to FIG. 3A, a forward face 308 of the explosive charge 304, in the illustrated embodiment, is generally V-shaped in cross-section; however, the invention is not so limited. Rather, the forward face 308, and the ceramic liner 310 affixed to the forward face 308, may have any cross-sectional shape known to the art, e.g., hemispherical, trumpet-shaped, or the like. The ceramic liner 310 comprises the ionizable material, as discussed above. Alternatively, as shown in FIG. 5C, the liner 510 may include a layer 318 of the ionizable material affixed to a ceramic base 320. In such an embodiment, the layer 318 may comprise, for example, an alkali metal, a compound of the alkali metal, a constituent of the compound of the alkali metal, a clathrate of the alkali metal, a constituent of the clathrate of the alkali metal, an intercalation compound of the alkali metal, or a constituent of the intercalation compound of the alkali metal.

Referring now to FIG. 3C, upon detonation of the explosive charge 304 (represented by a graphic 312) by the detonator 208, the ceramic liner 310 shatters into particles 314 (only one indicated for clarity) comprising the ionizable material and are projected forward (as indicated by arrow 316). Plasma trails 322 of ions and free electrons are generated as the ionizable material within the particles 314 are propelled through the air. The plasma trails 322 may be used to reradiate the electromagnetic waves 218 or propagate the electromagnetic waves 220, as discussed above and shown in FIGS. 2B and 2D.

Figures 4A, 4B:
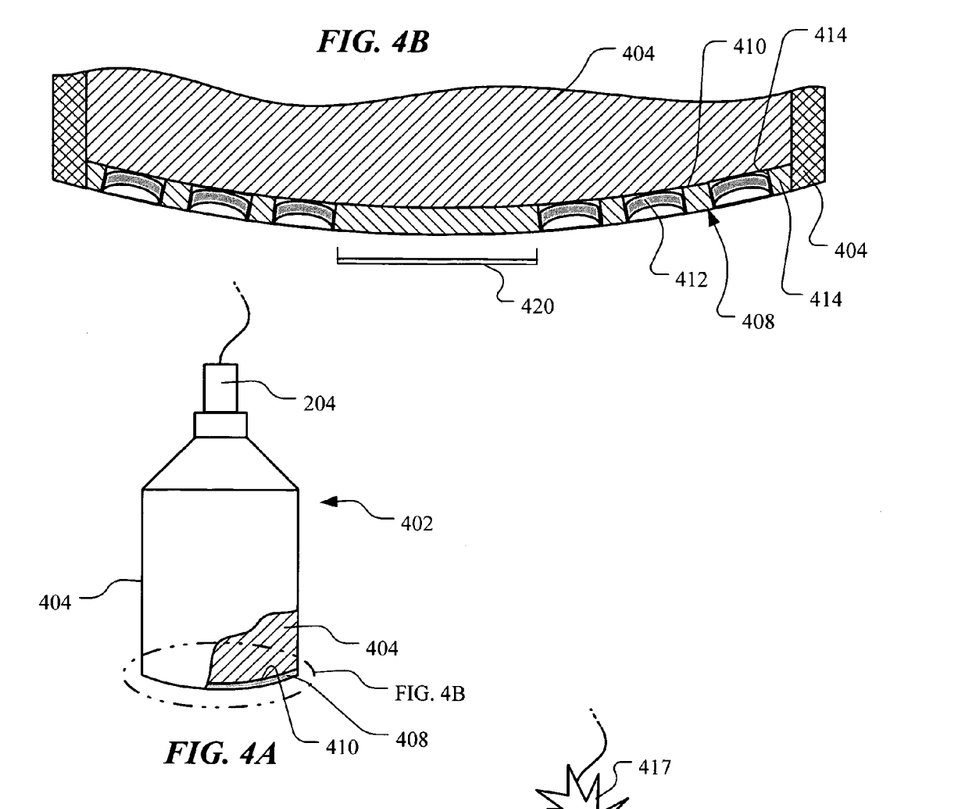
FIG. 4A is a partial cross-sectional, side view of a second embodiment of the explosive device of FIGS. 2A-2D alternative to that in FIGS. 3A-3B.
FIG. 4B is a cross-sectional view of a portion of an illustrative embodiment of a liner of FIG. 4A having a plurality of liners disposed in openings defined by a housing.

Referring now to FIG. 4A, a second embodiment 402 of the explosive device 204 according to the present invention is shown. In the illustrated embodiment, the explosive device 204 comprises an explosively formed projectile device 402. Conventionally, explosively formed projectile devices employ explosive products, created by detonating a highly explosive material, to create great pressures that accelerate a metallic liner while simultaneously reshaping it into a rod or some other chosen shape. The present explosively formed projectile device 402, however, comprises a ceramic liner that is shattered into particles and projected forward when the explosive material is detonated.

In the illustrated embodiment, the explosively formed projectile device 402 comprises an explosive charge 404 partially encased by a casing 406. The explosive charge 404 may be made of any explosive material known in the art having a high detonation velocity and/or high brisance, as discussed above. The explosively formed projectile device 402 further includes a ceramic liner 408 affixed to a forward face 410 of the explosive charge 404. Both the forward face 410 and the liner 408 affixed thereto may have any desired shape suitable for an explosively formed projectile device. In one embodiment, the liner 408 comprises a single ceramic liner that includes the ionizable material.

Alternatively, as illustrated in FIG. 4B, the liner 408 may comprise a plurality of ceramic liners 412 held within openings 414 defined by a housing 416. The ceramic liners 412 comprise the ionizable material, as defined above. While the ceramic liners 412 shown in FIG. 4B are concavely shaped, the invention encompasses ceramic liners 412 having any chosen shape suitable for such liners.

Figure 4C:
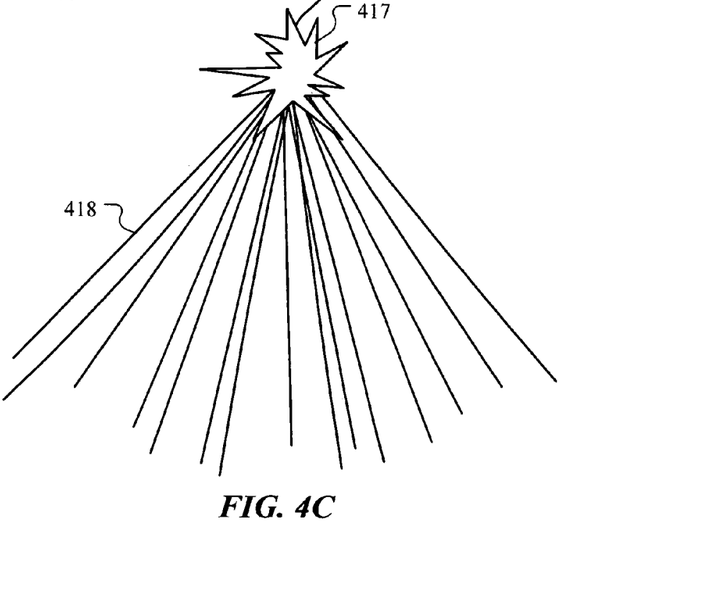
FIG. 4C is a stylized diagram of the explosive device of FIG. 4A in operation.

When the explosive charge 404 is detonated by the detonator 206, the ceramic liner 408 (of FIG. 4A) or the ceramic liners 412 (of FIG. 4B) are propelled by the resulting explosive force, as shown in FIG. 4C. Each of the ceramic liners 412 produces a plasma trail 418 (only one labeled for clarity) that can be used to reradiate or propagate an electromagnetic wave or pulse, as discussed above.

Figure 4D:
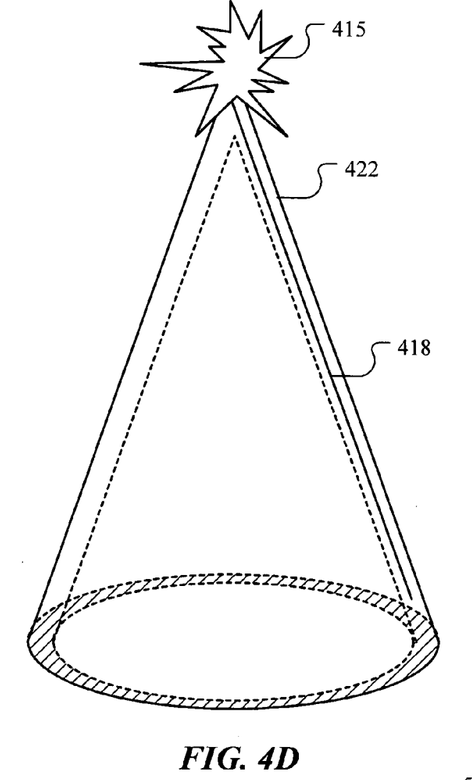
FIG. 4D is a stylized diagram of a generally hollow, conical pattern of plasma trails that may be formed by the explosive device of FIG. 4A.

In the embodiment illustrated in FIG. 4B, the ceramic liners 412 are arranged such that a central portion 420 of the housing 416 contains no slugs 416. As shown in FIG. 4D, such a configuration is designed to produce a hollow, conical pattern 422 of plasma trails 418 (only one shown). The present invention, however, encompasses any chosen configuration of ceramic liners 412 to produce a desired pattern of plasma trails 418.

Figure 5A:
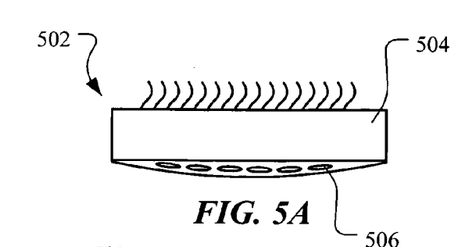
FIG. 5A is a side view of a third illustrative embodiment of the explosive device of FIGS. 2A-2D alternative to embodiments of FIGS. 3A-3B and FIGS. 4A-4D.
Figure 5B:
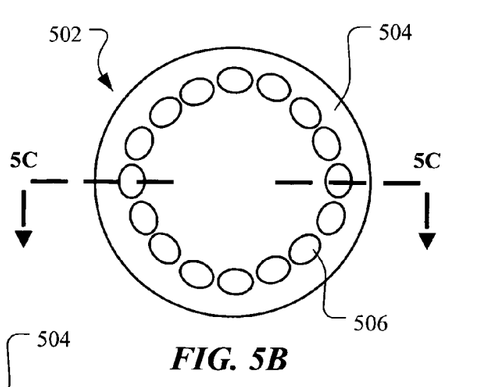
FIG. 5B is a bottom, plan view of the explosive device of FIG. 5A.
Figure 5C:
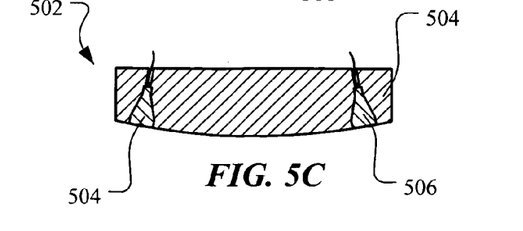
FIG. 5C is a cross-sectional view of the explosive device of FIGS. 5A and 5B taken along the line 5C-5C of FIG. 5B.
Figure 5D:
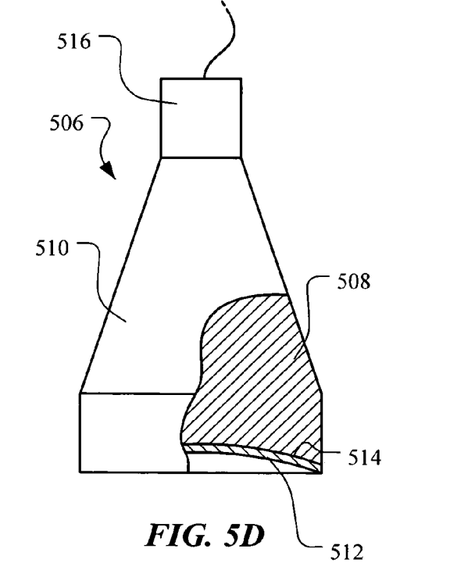
FIG. 5D is a partial cross-sectional, side view of an explosively formed projectile device of FIG. 5C.

FIGS. 5A-5D illustrate a third embodiment of the explosive device 204 according to the present invention, comprising a multiple explosively formed projectile device 502. In the illustrated embodiment, a housing 504 contains a plurality of explosively formed projectile elements 506 held in a chosen configuration. Each of the elements 506 comprises an explosive charge 508 partially encased by a casing 510, as shown in FIG. 5D. The explosive charge 508 may be made of any explosive material known in the art having a high detonation velocity and/or high brisance, as discussed above. Each of the elements 506 further includes a ceramic liner 512 affixed to a forward face 514 of the explosive charge 508. Both the forward face 514 and the ceramic liner 512 affixed thereto may have any desired shape suitable for such a device. The ceramic liner 512 comprises the ionizable material, as discussed above.

When each of the explosive charges 508 is detonated by the detonators 516, the ceramic liners 512 are propelled by the resulting explosive force in the same fashion as the second embodiment, as shown in FIG. 4C. Each of the ceramic liners 512 produces one of the plasma trails 418 (only one labeled for clarity) that can be used to reradiate or propagate electromagnetic waves or pulses, as discussed above.

In the embodiment illustrated in FIGS. 5A-5C, the elements 506 are arranged to produce a hollow, conical pattern similar to the conical pattern 422 of plasma trails 418 (only one shown) produced by the second embodiment, as shown in FIG. 4D. The present invention, however, encompasses any desired configuration of liners 512 to produce a chosen pattern of plasma trails 418. For example, various elements 506 held by the housing 504 may ceramic liners 512 having different configurations.

Figures 6A, 6B:
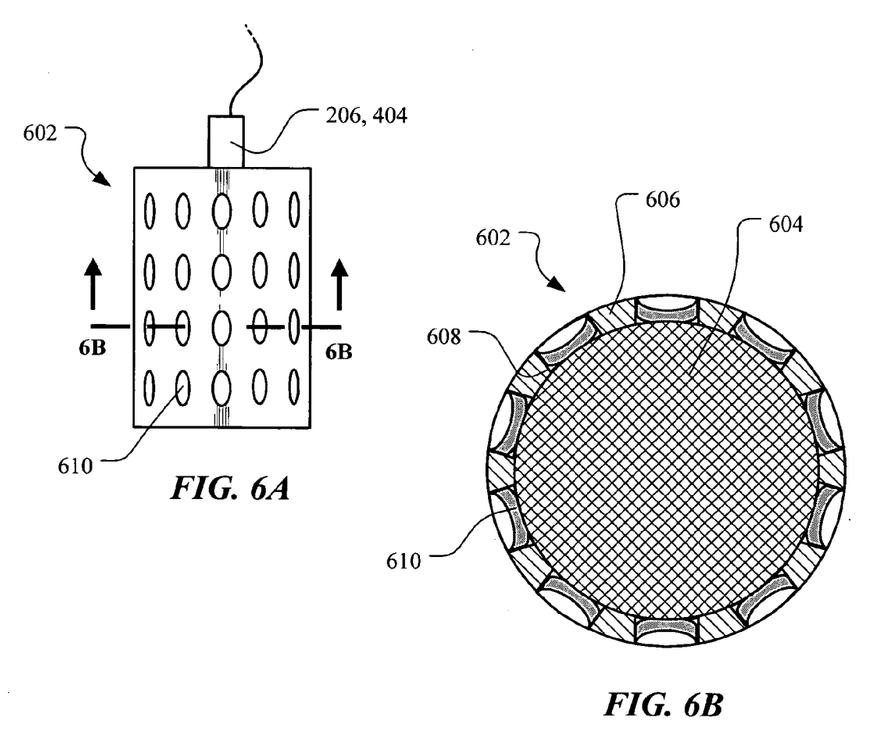
FIG. 6A is a side view of a fourth illustrative embodiment of the explosive device of FIGS. 2A-2D alternative to the embodiments of FIGS. 3A-3B, FIGS. 4A-4D, and FIGS. 5A-5D.
FIG. 6B is a cross-sectional view of the explosive device of FIG. 6A taken along the line 6B-6B in FIG. 6A.

FIGS. 6A and 6B illustrate a fourth embodiment of the explosive device 204 according to the present invention comprising a radial explosively formed projectile device 602. The device 602 comprises an explosive charge 604 partially encased by a casing 606. The explosive charge 604 may be made of any explosive material known in the art having a high detonation velocity and/or high brisance, as discussed above. The casing 606 defines a plurality of openings 608 in which are disposed a corresponding plurality of ceramic liners 610. The ceramic liners 610 comprise the ionizable material, as defined above. Further, the ceramic liners 610 may have a construction such as that shown in FIG. 5B or 5C.

Figure 6C:
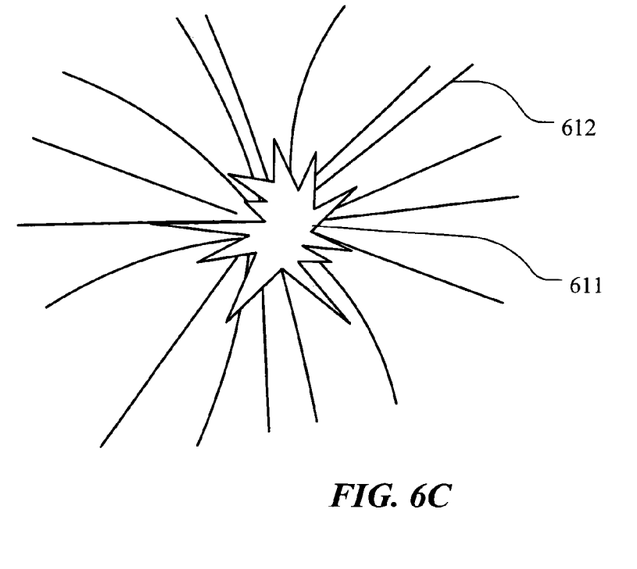
FIG. 6C is a stylized diagram of the explosive device of FIG. 6A in operation.

When the explosive charge 604 is detonated (represented by a graphic 611) by the detonator 208, 404, the ceramic liners 610 are propelled by the resulting explosive force, as shown in FIG. 6C. Each of the ceramic liners 610 produces a plasma trail 612 (only one labeled for clarity) that can be used to reradiate the electromagnetic pulse emitted from the electromagnetic pulse generator 204 (as illustrated in FIG. 2B) or to reradiate the electromagnetic pulse emitted from the coil 410 (as illustrated in FIG. 4B).

Note that ceramic liners are not used in conventional shaped charge devices or conventional explosively formed projectile devices. Liners for these devices typically comprise copper, a copper alloy, or other such ductile metal that, upon detonation, will form a high speed jet.

The electromagnetic pulse generator 204 may be any type of generator known to the art capable of generating an electromagnetic pulse. Examples of such electromagnetic pulse generators can be found in U.S. Pat. No. 6,843,178, which is hereby incorporated by reference in its entirety for all purposes.

As discussed above concerning FIGS. 2A and 2C, some embodiments of the present invention may include a separate ceramic portion 212 that provides ionizable material for plasma antenna generation. In such embodiments, the explosive device 204 may also comprise a ceramic material, wherein both the explosive device 204 and the ceramic portion 212 provide ionizable material for plasma antenna generation. Alternatively, the explosive device 204 may comprise a conventional explosive device (e.g., a conventional shaped charge, explosively formed projectile, or the like), as the ionizable material is provided by the ceramic portion 212.

Moreover, the ceramic portion 212 may employ any desired component comprising a ceramic material that provides sufficient ionizable material for plasma antenna generation. For example, the ceramic portion 212 may take on the form of an element specifically designed and implemented solely to provide ionizable material for plasma antenna generation. Alternatively, the ceramic portion 212 may comprise an ancillary element, device, or apparatus that also serves another purpose but that is disposed proximate the explosive device 204 such that, upon detonation of the explosive device 204, ionizable material of the element, device, or apparatus is ionized to form a plasma antenna. Examples of such ancillary elements, devices, or apparatuses include, but are not limited to windows (e.g., seeker windows), electronic components, radomes, and the like. Accordingly, the scope of the present invention encompasses the use of any ionizable material-containing element, device, or apparatus as the ceramic portion 212, so long as the ceramic portion 212 and the explosive device 204 (if it comprises ionizable material) provide sufficient ionizable material to generate a plasma antenna. Note that, with proper deployment timing, a plasma antenna of the present invention may be used to receive electrical signals.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

What is claimed is:

1. A plasma antenna generator, comprising:
   a ceramic portion including an ionizable material;
   an explosive charge adapted to project at least part of the ceramic portion upon detonation at a velocity sufficient to ionize the ionizable material; and
   a detonator coupled with the explosive charge.

2. A plasma antenna generator, according to claim 1, wherein the ionizable material comprises:
   an alkali metal, a compound of one or more alkali metals, a constituent of a compound of one or more alkali metals, a clathrate of an alkali metal, a constituent of the clathrate of the alkali metal, an intercalation compound of an alkali metal, or a constituent of the intercalation compound of the alkali metal.

3. A plasma antenna generator, according to claim 1, wherein the plasma antenna generator comprises:
   a shaped charge device, wherein the shaped charge device comprises the explosive charge and a ceramic liner, the ceramic liner comprising the ceramic portion.

4. A plasma antenna generator, according to claim 1, wherein the plasma antenna generator comprises:

an explosively formed projectile device, wherein the explosively formed projectile device comprises:
the explosive charge and a ceramic liner, the ceramic liner comprising the ceramic portion.

5. A plasma antenna generator, according to claim 1, further comprising:
a casing defining a cavity in which the explosive charge is disposed and a plurality of openings therethrough; and
a plurality of ceramic liners received in the plurality of openings, the ceramic portion comprising the plurality of ceramic liners.

6. A plasma antenna generator, according to claim 1, wherein the explosive charge comprises:
a material selected from the group consisting of cyclotetramethylenetetranitramine, a cyclotetramethylenetetranitramine blend, cyclotrimethylenetrinitramine, a cyclotrimethylenetrinitramine blend, and a cyclotetramethylenetetranitramine/estane blend.

7. A plasma antenna generator, according to claim 1, wherein the ceramic portion is disposed on the explosive charge.

8. A plasma antenna generator, according to claim 1, further comprising an electromagnetic pulse generator.

9. A plasma antenna generator, according to claim 1, further comprising:
a casing defining a cavity in which the explosive charge is disposed; and
a liner affixed to a forward face of the explosive charge, the liner comprising the ceramic portion.

10. A plasma antenna generator, according to claim 9, wherein the liner further comprises:
a ceramic base and a layer of the ionizing material affixed thereto.

11. A plasma antenna generator, according to claim 1, further comprising:
a casing defining a cavity in which the explosive charge is disposed;
a housing defining a plurality of openings therethrough and affixed to a forward face of the explosive charge; and
a plurality of ceramic liners received in the plurality of openings, the ceramic portion comprising the plurality of ceramic liners.

12. A plasma antenna generator, according to claim 11, wherein the plurality of openings are defined by the housing such that the plurality of ceramic liners are adapted to produce a generally hollow, conical pattern of plasma trails upon detonation of the explosive charge.

13. A plasma antenna generator, according to claim 1, wherein the ceramic portion comprises:
an ancillary element, device, or apparatus.

14. A plasma antenna generator, according to claim 13, wherein the ancillary element, device, or apparatus comprises:
a window, an electronic component, or a radome.

15. An electromagnetic pulse transmitting system, comprising:
an electromagnetic pulse generator; and
a plasma antenna generator, comprising:
a ceramic portion comprising an ionizable material;
an explosive charge adapted to project at least part of the ceramic portion upon detonation at a velocity sufficient to ionize the ionizable material; and
a detonator coupled with the explosive charge.

16. An electromagnetic pulse transmitting system, according to claim 15, wherein the ceramic portion is disposed on the explosive charge.

17. An electromagnetic pulse transmitting system, according to claim 15, wherein the ceramic portion comprises:
an ancillary element, device, or apparatus.

18. An electromagnetic pulse transmitting system, according to claim 17, wherein the ancillary element, device, or apparatus comprises:
a window, an electronic component, or a radome.

* * * * *